(12) United States Patent  
Patarchi

(10) Patent No.: US 6,469,412 B1  
(45) Date of Patent: Oct. 22, 2002

(54) UNIVERSAL ELECTRIC MOTOR WITH VARIABLE AIR GAP

(76) Inventor: Alberto Patarchi, Viale della Marina, 3, 00122 Ostia Lido (Rome) (IT)

( * ) Notice: Subject to any disclaimer, the term of this patent is extended or adjusted under 35 U.S.C. 154(b) by 0 days.

(21) Appl. No.: 09/719,779

(22) PCT Filed: May 27, 1999

(86) PCT No.: PCT/IT99/00149

§ 371 (c)(1),
(2), (4) Date: Dec. 18, 2000

(87) PCT Pub. No.: WO99/66627

PCT Pub. Date: Dec. 23, 1999

(30) Foreign Application Priority Data

Jun. 18, 1998 (IT) .................................... RM98A0410

(51) Int. Cl.$^7$ ............................................. H02K 23/64
(52) U.S. Cl. ........................ 310/158; 310/191; 310/209
(58) Field of Search ................................ 310/158, 168, 310/181, 192, 209, 152, 156.01, 191

(56) References Cited

U.S. PATENT DOCUMENTS 5,122,697 A * 6/1992 Horst .......................... 310/181
5,294,856 A * 3/1994 Horst .......................... 310/181
6,133,664 A * 10/2000 Torok et al. ................. 310/181

* cited by examiner

Primary Examiner—Nestor Ramirez
Assistant Examiner—Thanh Lam
(74) Attorney, Agent, or Firm—Browdy and Neimark, P.L.L.C.

(57) ABSTRACT

The present invention relates to a universal electric motor with variable air gap. It has a rotor (1) with on or more attraction steps and a stator (2) provided with an excitation system. The excitation system comprises, mounted consecutively distanced on a stator support (20) facing the rotor (1), at least an electromagnet (21), provided with an armature (24) and with a winding (25), a control circuit (22), provided with a position detector (26) for supply power to the electromagnet, and a permanent magnet (23). The electromagnet, and a permanent magnet (23). The electromagnet (21) and the permanent magnet (23) are fastened onto the stator support (20) to excite the rotor alternatively, and in adjustable positions the direction of rotation of the rotor itself.

9 Claims, 6 Drawing Sheets

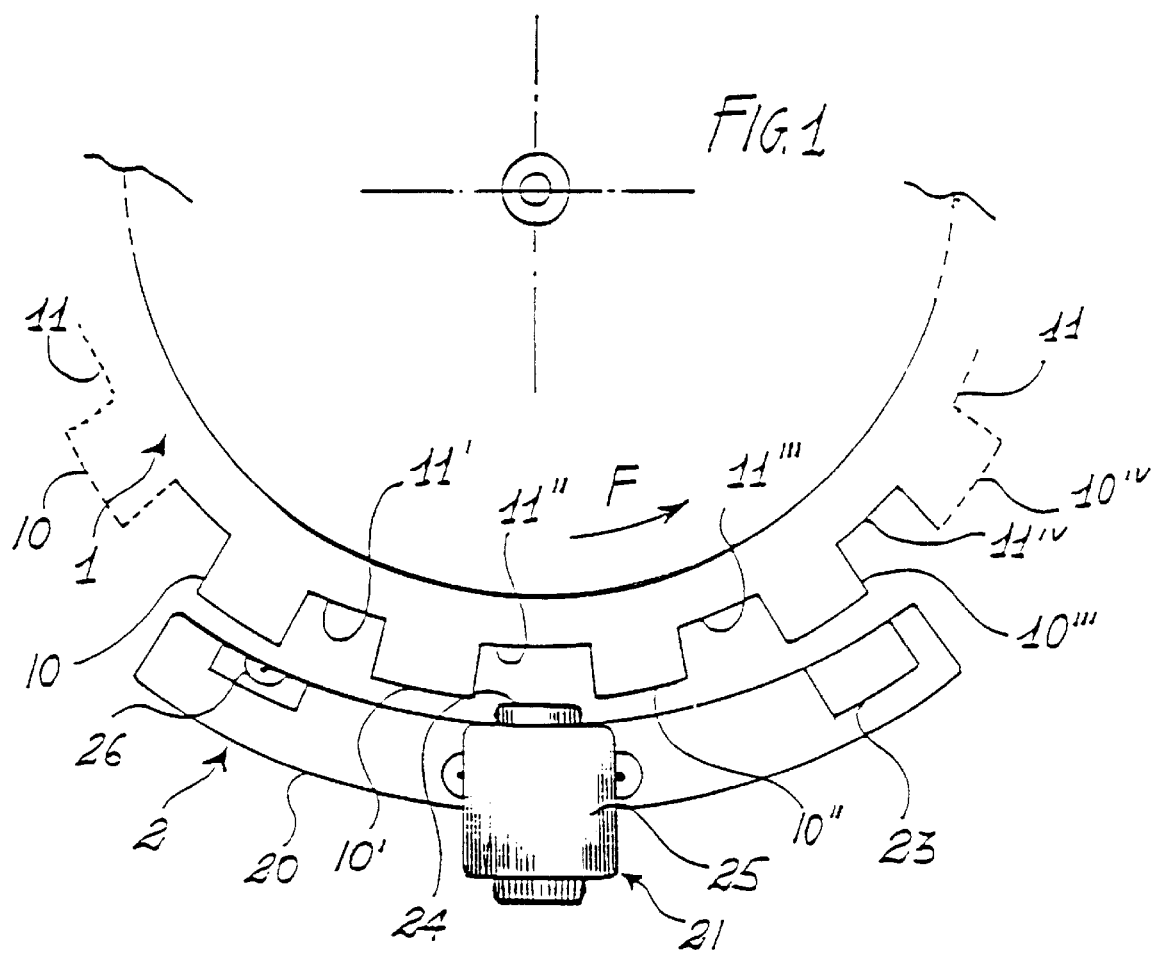
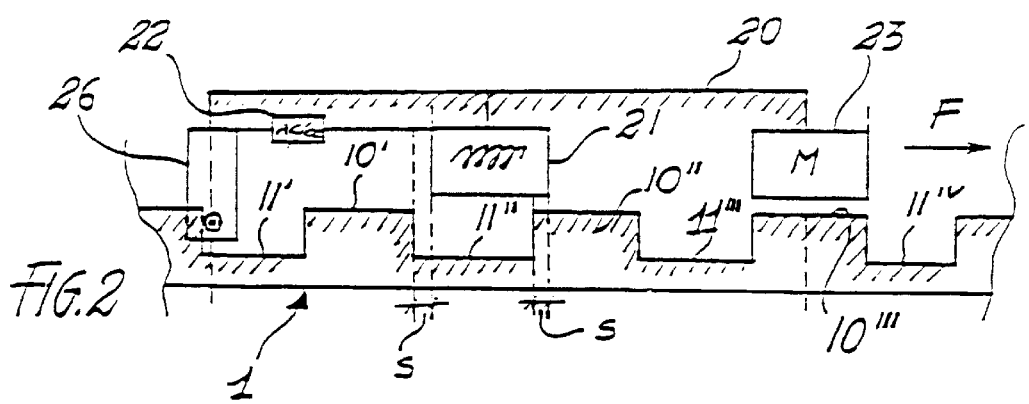
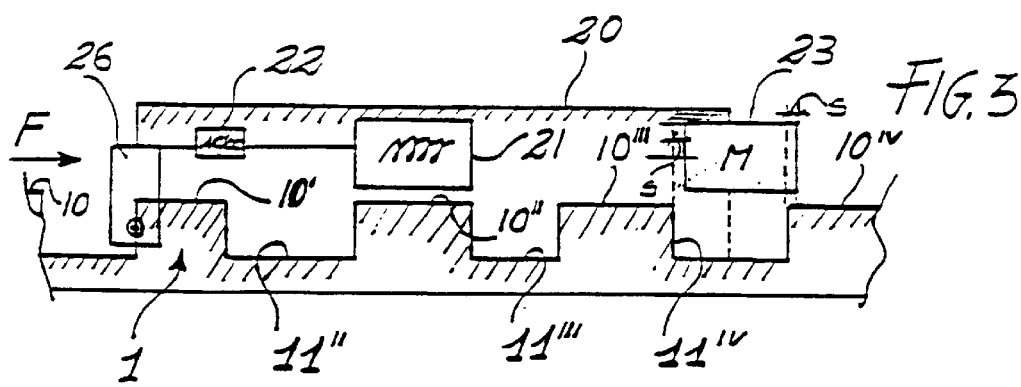

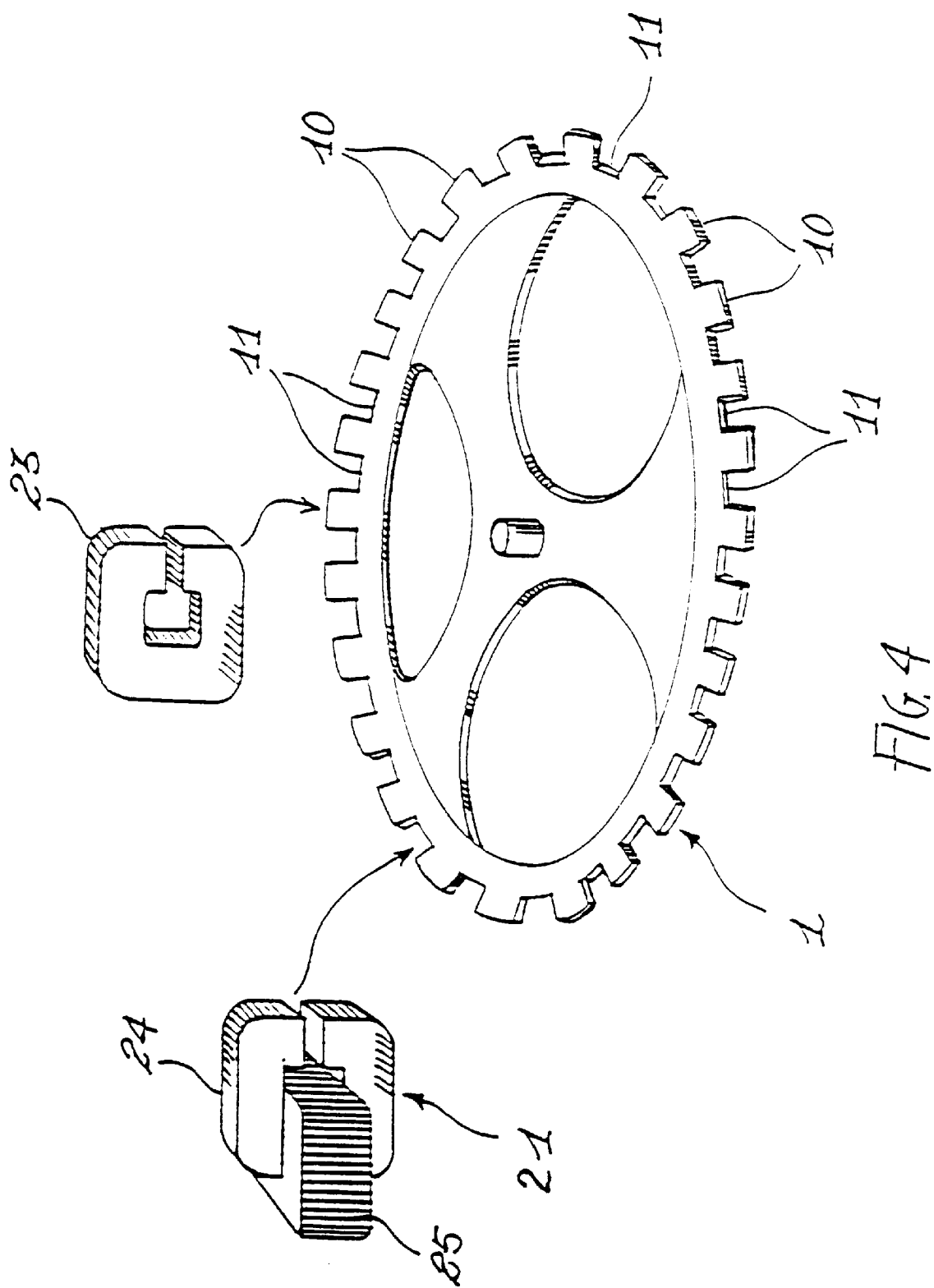

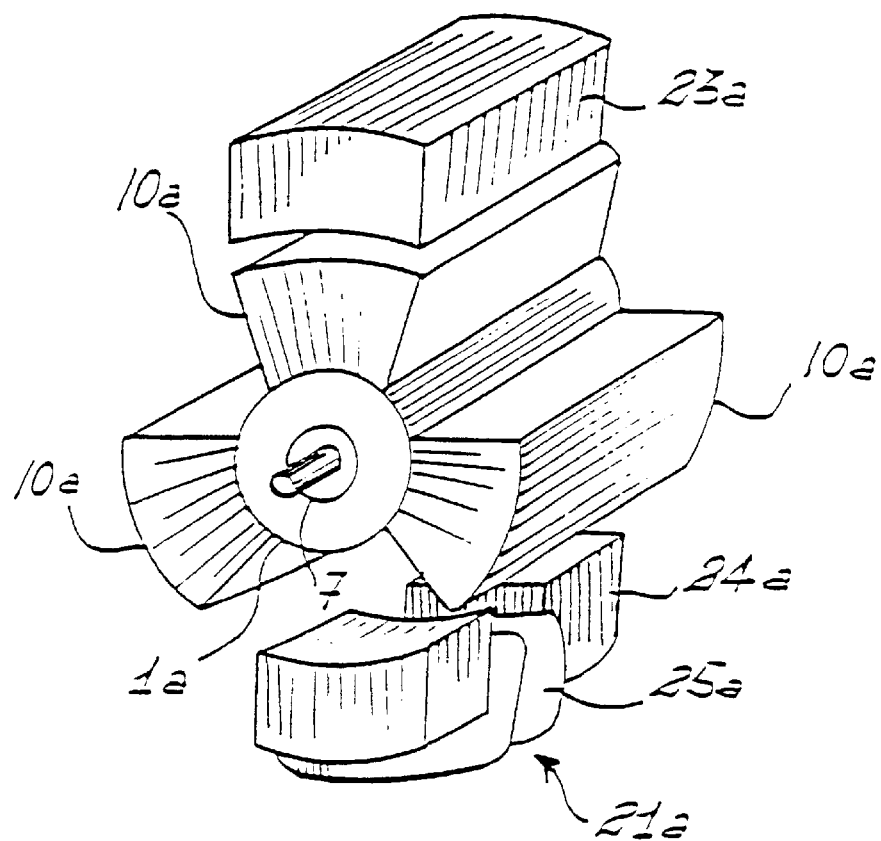
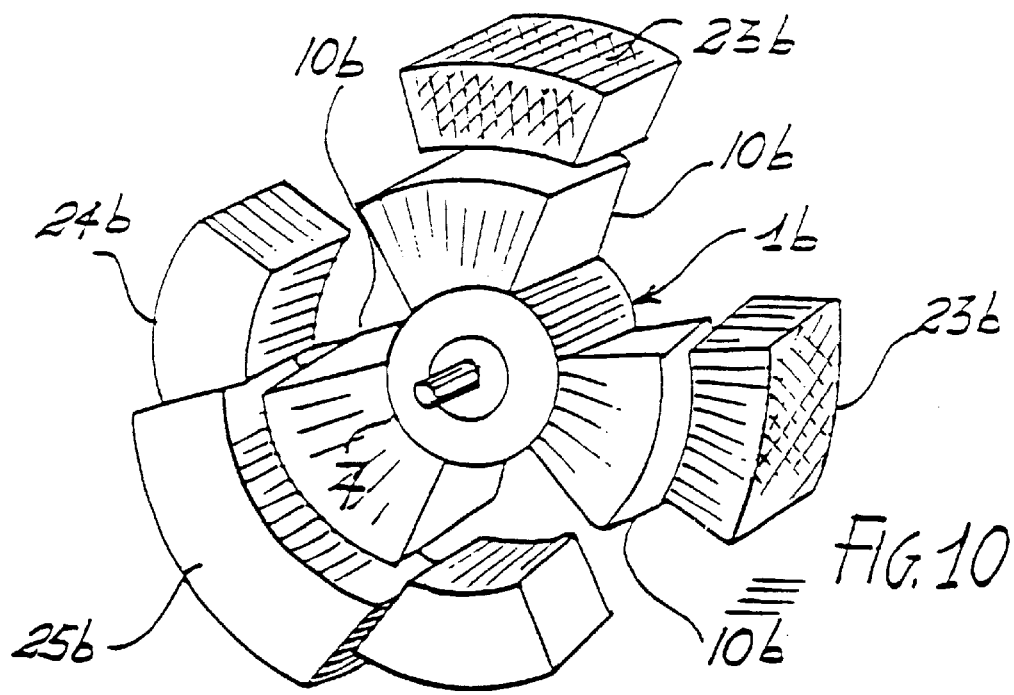

US 6,469,412 B1

UNIVERSAL ELECTRIC MOTOR WITH VARIABLE AIR GAP

TECHNICAL FIELD

The present invention relates to a universal electric motor with variable air gap.

Stepped electrical motors with variable reluctance are already known, having a rotor formed by a core with cylindrical shape, whose teeth are positioned along the lateral surface, and a coaxial stator having a plurality of excitation windings in a number different from that of the teeth, as shown by FR. No. 2 275 925, for instance.

Such motors are generally complex from the constructive standpoint. Moreover, since the windings are energized according to many periodically alternating phases, such motors give problems in terms of electromagnetic leakage and of the resulting pollution.

DISCLOSURE OF INVENTION

The aim of the present invention therefore is to eliminate the aforementioned drawbacks, providing a constructively simple electric motor, which presents reduced leakage and lesser electromagnetic pollution with respect to traditional motors of the same kind.

A further aim of the present invention is to provide an electric motor which can function as well with direct current and with alternating current power supply, that is to say a so-called universal electric motor.

Yet another aim of the present invention is to provide an electric motor which can be started safely in both directions of rotation.

The invention solves the problem of providing a universal electric motor with variable air gap, of the circumferentially equidistant teeth mutually separated by grooves, and a stator provided with an excitation system, which from a general standpoint is characterized in that said excitation system comprises, mounted consecutively distanced on a stator support facing said rotor, at least an electromagnet, provided with an armature and with a winding, a control circuit, provided with a position detector for supplying power to the electromagnet, and a permanent magnet; said electromagnet and said permanent magnet being fastened on said stator support to excite the rotor alternatively, and in adjustable positions to change the direction of rotation of the rotor itself.

Thus, in the motor according to the invention, having a rotor, for instance made of ferromagnetic material with one or more teeth, and a stator with an electromagnet, indifferently powered with direct or alternating current, and with a permanent magnet, positioned in such a way as to provide the direction of rotation and overcome the neutral point, alternating attractions of the electromagnet and of the permanent magnet are created on the teeth of the rotor by means of the control circuit that drives the power supply to the motor.

Although in the present description the invention is described with reference to a rotating motor, it can also be applied to linear motors or to annular linear motors and devices for partial servo-controls.

Moreover, the stator, as described herein, can be movable, and hence the rotor can be fixed, inverting the configuration described above without any other modification.

Among the other advantages noted are excellent efficiency levels thanks to the perfect closure of the magnetic flow between stator and rotor. The total power expended for the rotation of the motor is reduced since the power provided by the electromagnet to repel the permanent magnet from one rotor tooth is substantially identical to that provided by the attraction of the magnet to the rotor tooth of the following step.

The motor according to the invention has particularly simple components, and therefore its cost is reduced.

The power of the motor can be varied by increasing the number of electromagnets and permanent magnets on the stator from a single pair to multiple pairs thereof, or the number of single electromagnets or permanent magnets.

The motor according to the invention can be applied, instead of to a rotor made of ferromagnetic material, to a rotor whose teeth are polar expansions permanently magnetized with the same polarity as the permanent magnet of the excitation system, or opposite thereto. In this case, the motor functions by repulsion or, respectively, by attraction and for the offset required for its motion it is the electromagnet winding that is off-center with respect to the polar pitch, to the right or to the left of the desired direction of rotation. Therefore, the power of the electromagnet serves to win the repulsion or attraction force of the permanent magnet and to provide the desired power to the motor shaft.

Further features and advantages of the invention shall be made more readily apparent from the content of the detailed description that follows, of embodiments illustrated purely by way of non limiting indication in the accompanying drawings.

DESCRIPTION OF DRAWINGS

FIG. 1 shows a partial schematic plan view of a first embodiment of an electric motor according to the present invention;

FIGS. 2 and 3 show a schematic lateral view of a rectified portion of the motor of FIG. 1 with ferromagnetic teeth in two of its respective operating positions;

FIG. 4 shows a perspective view of some parts of the electric motor of FIG. 1;

FIG. 9 shows a perspective view of a second embodiment of an electric motor;

FIG. 10 shows a perspective view of a third embodiment of an electric motor;

DESCRIPTION OF THE ILLUSTRATIVE EMBODIMENTS

Figure 5:
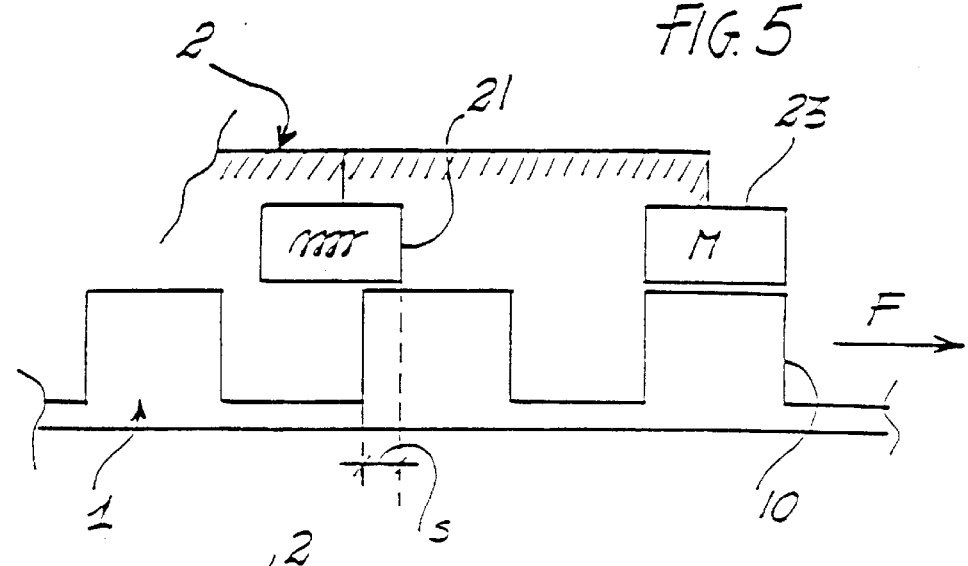
FIGS. 5 and 6 shows a schematic lateral view of a rectified portion of the motor of FIG. 1 shaped for rotation in one direction of rotation and, respectively, in the opposite direction.

According to the present invention, in FIGS. 1 and 3 the number 1 indicates a rotor with multiple attraction steps and the number 2 indicates a stator provided with an excitation system. The rotor 1, of the linear type enclosed in a loop, very flat, presents a multiplicity of circumferentially equidistant teeth 10, mutually separated by grooves 11. The excitation system provided in the stator 2 comprises, mounted consecutively distanced on a rotor support 20 facing the rotor 1, at least an electromagnet 21, a control circuit shown schematically as 22, and a permanent magnet 23.

The electromagnet 21, provided with an armature 24 and a winding 25 (FIG. 1), is connected to the control circuit 22. The control circuit 22 is provided with a position detector 26, such as an optical, magnetic, resistive, inductive transducer, etc., or operating with electronic circuits, as well as brush commutators, useful to drive the electromagnet power supply, as will be seen farther on.

The teeth 10 of the rotor can be made of ferromagnetic material or permanent magnets.

FIGS. 2 and 3 schematically show by way of example the case of ferromagnetic teeth. The electromagnet 21 and the permanent magnet 23 are fastened onto the stator support 20 in positions such that, assuming the direction of rotation indicated by arrow F in FIGS. 1 through 3, when the position detector 26 faces the leading edge of a groove 11' (FIGS. 1 and 2), the electromagnet armature 24 can overlap a subsequent groove 11" and, in addition, a portion of tooth 10", for an offset distance s, whilst the permanent magnet 23 overlaps a subsequent tooth 10'". In this way, the electromagnet 21 is excited by means of the control circuit 22 with alternating or direct current, through its position detector 26, and tends to attract the tooth 10" overcoming, in the ideal case with no mechanical load and no friction loss, the force of attraction of the permanent magnet 23 on the tooth 10'".

When said position detector faces the leading edge of the tooth 10' (FIG. 3), it de-energizes the coil 21 through the control circuit 22, the electromagnet armature 25 overlaps the subsequent tooth 10", whilst the permanent magnet 23 overlaps the subsequent groove $11^{IV}$ in a position offset towards a subsequent tooth $10^{IV}$, in such a way as to attract it, until the position detector reaches the leading edge of the groove 11" to repeat the cycle anew.

Figure 7:
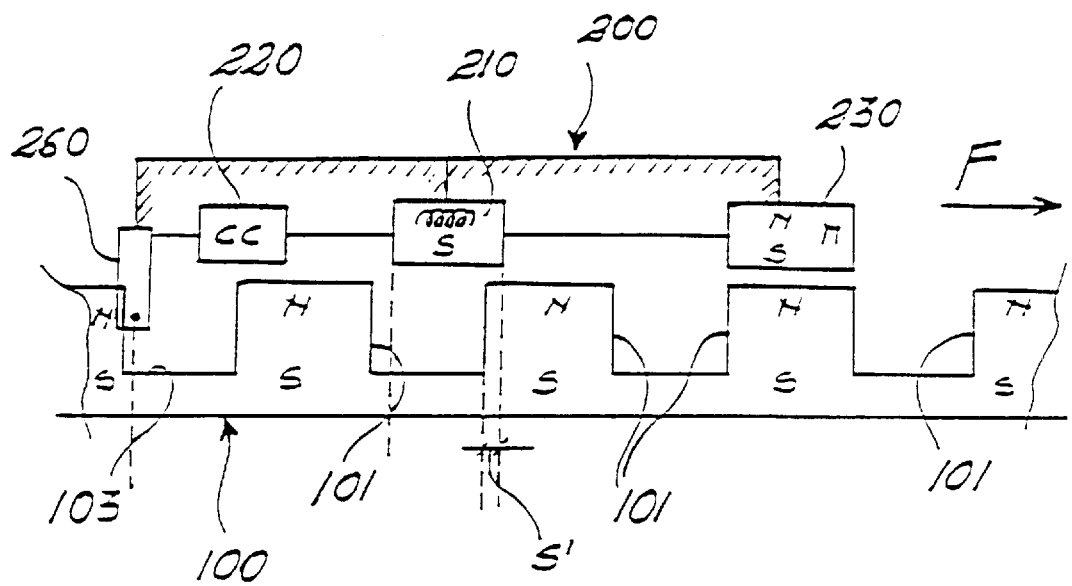
FIGS. 7 and 8 show a schematic lateral view of a rectified portion of the motor of FIG. 1 with permanent magnet teeth operating by attraction and, respectively, by repulsion.
Figure 8:
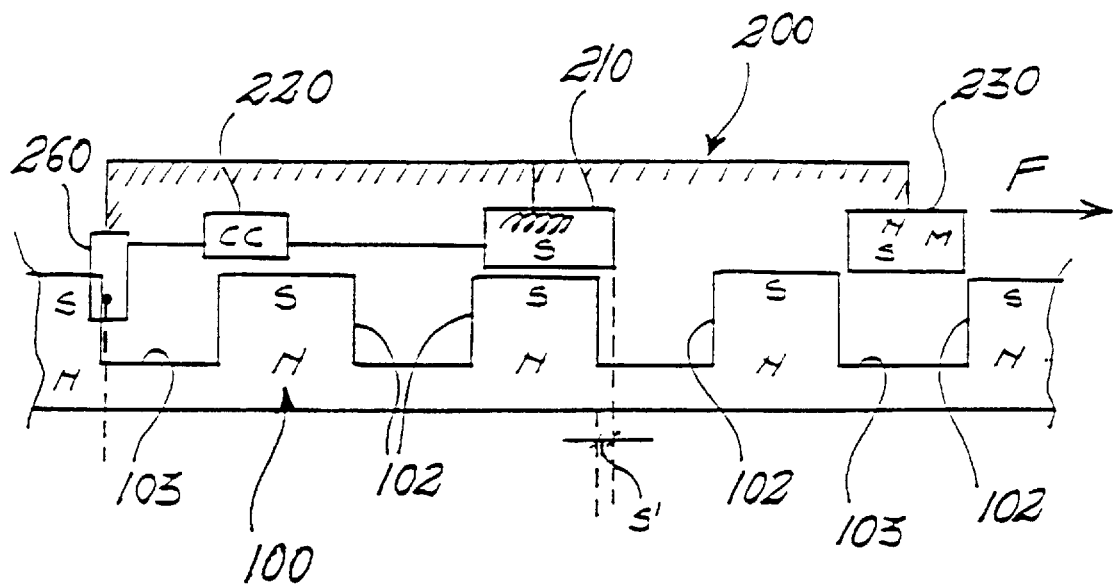

In the case of permanent magnet teeth 101 or 102, depending on the polar disposition, as shown in FIGS. 7 and 8, the electromagnet 210, operating with direct current, and the permanent magnet 230 are fastened onto the stator support 200 in such positions that, with the same direction of rotation F, when the position detector 260 faces the leading edge of a groove 103, the electromagnet armature 210 overlaps a subsequent groove 103 and a portion of subsequent tooth 101, whilst the permanent magnet 230 overlaps a subsequent tooth, when the mutually facing polarities of magnet and tooth are opposite (FIG. 7). When instead such polarities are equal (FIG. 8), the electromagnet 210 and the permanent magnet 230 are fastened onto the stator support 200 in such positions that, with the same direction of rotation F, when the position detector 260 faces the leading edge of a groove 103, the electromagnet armature 210 overlaps a subsequent tooth 102 and a portion of subsequent groove 103, whilst the permanent magnet 230 overlaps a subsequent groove 103.

Figure 6:
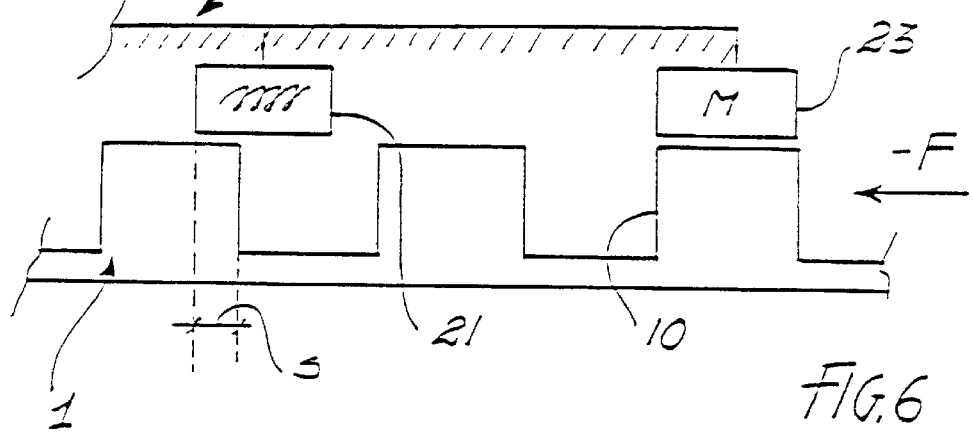

According to the invention the electromagnet and the permanent magnet are fastened onto the stator support in adjustable positions to change the direction of rotation of the rotor, as shown in FIGS. 5 and 6. The distance between electromagnet 21 and magnet 23 in the mechanical coupling on the stator support 20 determines the direction of rotation of the rotor 1. With magnet 23 overlapping a tooth 10, the direction of rotation of the rotor 1 is the one indicated by arrow F, when the electromagnet 21 overlaps the leading edge of a preceding tooth (FIG. 5), whilst it is the opposite direction when the electromagnet 21 overlaps the trailing edge of a preceding tooth (FIG. 6).

From the standpoint of the interaction between the rotor and the excitation system, the electromagnet armature 24 and the permanent magnet 23, as shown in FIG. 4, face, with their air gap, laterally, both opposite peripheral extremities of the rotor 10.

In reference to FIG. 9, a second embodiment of the motor according to the invention is shown. The rotor 1a is axially elongated and presents three teeth indicated generally as 10a. The electromagnet 21a presents an armature 24a and a winding 25a. The electromagnet armature 24a and the permanent magnet 23a are correspondingly elongated and laterally face, with their air gap, the rotor 1a.

In reference to FIG. 10, a third embodiment of the motor according to the invention is shown. The rotor 1b is considerably flattened with respect to the motor of the second embodiment and, similarly, it presents three teeth indicated generically as 10b. The electromagnet 21b presents an armature 24b and a winding 25b. The electromagnet armature 24a and two permanent magnets 23b laterally face, with their air gap, the rotor 1b.

Figure 11:
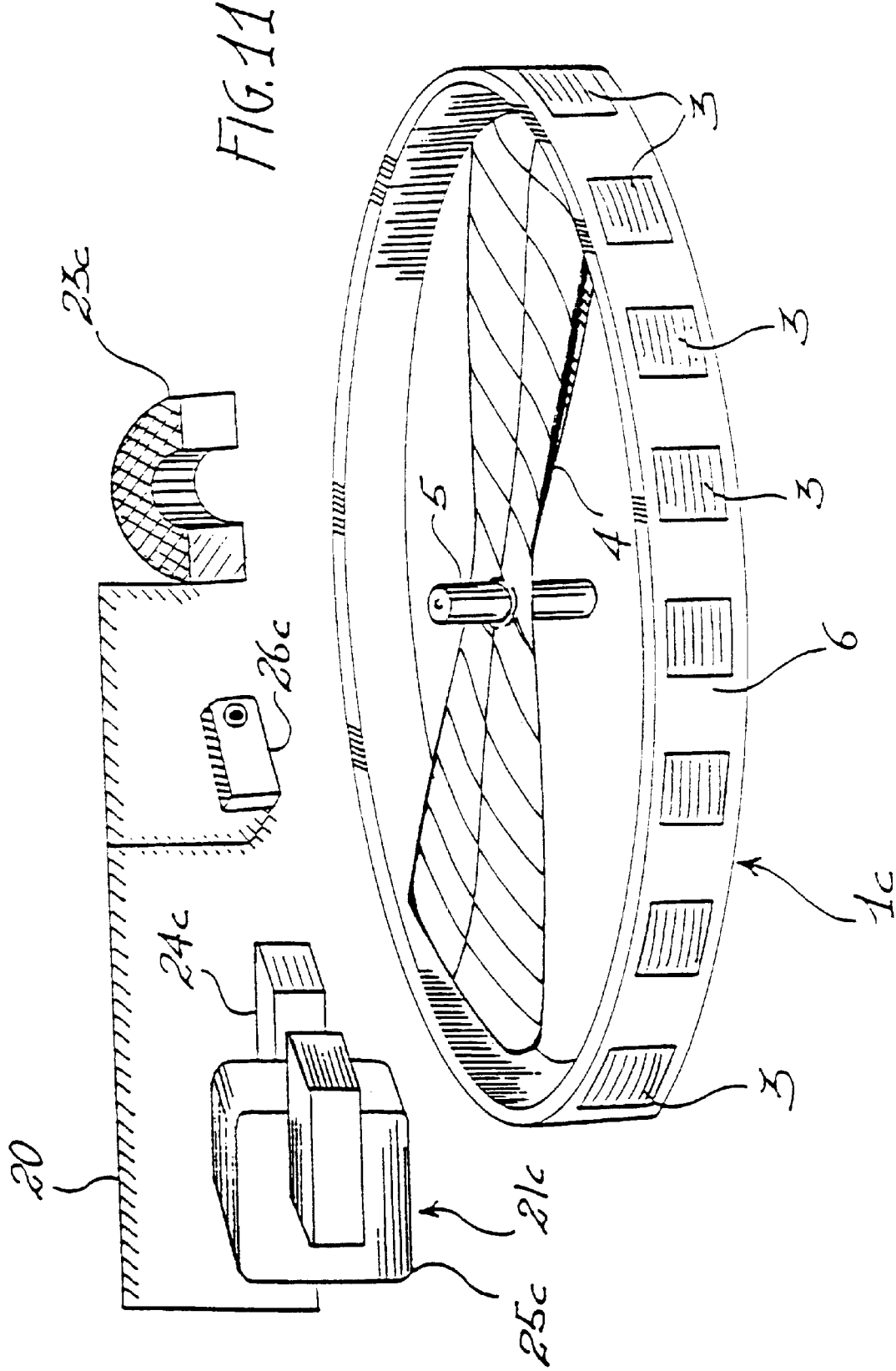
FIG. 11 shows an exploded perspective view of a fourth embodiment of an electric motor.

In reference to FIG. 11, a fourth embodiment of the motor according to the invention is shown. The rotor 1c is an annular track 6, made for instance of plastic material, bearing inserts 3 made of ferromagnetic material. As shown, the rotor 1c is integral with a blade 4 centrally provided with a support element 5 for the rotation of the rotor. The excitation system is represented schematically by an electromagnet 21c, presenting an armature 24c and a winding 25c, a permanent magnet 23c and a position detector 26c.

Figure 12:
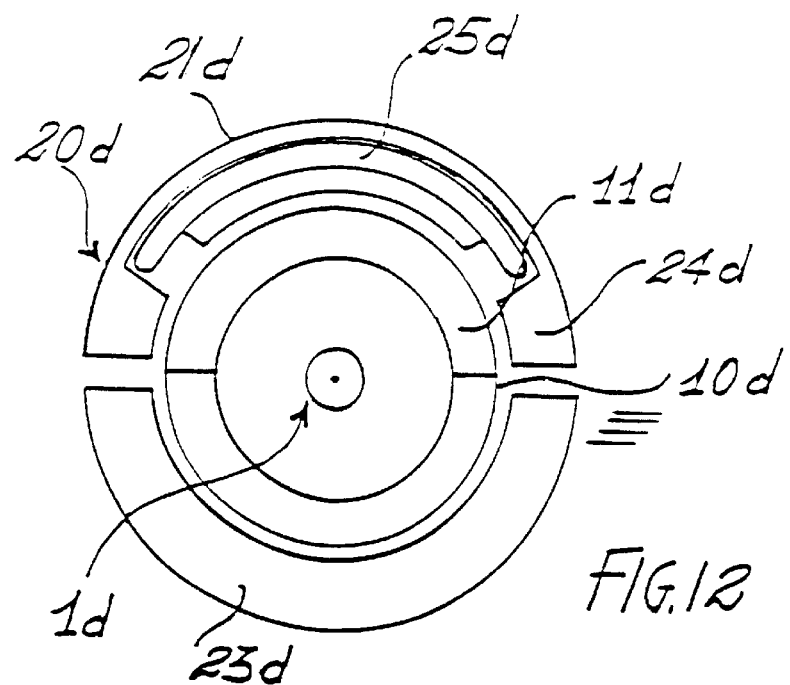
FIG. 12 shows an end view of a fifth embodiment of an electric motor.

In reference to FIG. 12, a fifth embodiment of the motor according to the invention is shown. The rotor 1d has a single attraction step, presenting a single ferromagnetic tooth 10d and a neutral step lid, of the same mass density as the tooth 10d.

On a stator support 20d, the excitation system is schematically represented by an electromagnet 21d, presenting an armature 24d and a winding 25d, and a permanent magnet 23d. The operation of the excitation system is as described with reference to the first embodiment.

The invention thus conceived can be subject to numerous modifications and variations, without thereby departing from the scope of the inventive concept.

What is claimed is:

1. A universal electric motor with a variable air gap, said motor having a rotor presenting one tooth or multiple circumferentially equidistant teeth mutually separated by grooves, and a stator provided with an excitation system, wherein said excitation system comprises, mounted consecutively distanced on a stator support facing said rotor: at least one electromagnet composed of an armature and a winding; a control circuit provided with a position detector for controlling the supply of power to said electromagnet; and a permanent magnet, wherein said electromagnet and said permanent magnet are fastened onto said stator support for alternatively exciting said rotor, and at least one of said electromagnet and said permanent magnet is fastened in a manner to be in a position that is adjustable on said stator support to vary the distance between said electromagnet and said permanent magnet in order to change the direction of rotation of said rotor.

2. The electric motor according to claim 1, wherein said rotor has teeth made of ferromagnetic material.

3. The electric motor according to claim 1, wherein said rotor has teeth composed of permanent magnets.

4. The electric motor according to claim 1, wherein said electromagnet armature and said permanent magnet face, with their air gap, laterally, said rotor.

5. The electric motor according to claim 1, wherein at least one of said electromagnet armature and said permanent magnet has two poles each facing a respective one of two opposite surfaces of said rotor.

6. The electric motor according to claim 1, wherein said rotor has teeth made of ferromagnetic material or composed of permanent magnets and at least one of said electromagnet and said permanent magnet on said stator support has two magnetically opposite poles disposed relative to said rotor so that both of said poles interact with said teeth of said rotor.

7. The electric motor according to claim 1, wherein said rotor has teeth made of ferromagnetic material or composed of permanent magnets and said electromagnet and said permanent magnet on said stator support each has two magnetically opposite poles disposed relative to said rotor so that both of said poles interact with said teeth of said rotor.

8. The electric motor according to claim 1, wherein said permanent magnet is not provided with a winding and there is a total of only one winding associated with one said electromagnet and said permanent magnet.

9. The electric motor according to claim 1, wherein said rotor has teeth composed of permanent magnets and all of said permanent magnets are oriented to have identical magnetic pole orientations.

\* \* \* \* \*